（12） United States Patent
Suto et al.

(10) Patent No.: US 11,560,000 B2
(45) Date of Patent: Jan. 24, 2023

(54) PRINTING APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventors: Takuya Suto, Kanagawa (JP); Toshiro Sugiyama, Kanagawa (JP); Ryosuke Murata, Tokyo (JP); Daigo Kuronuma, Kanagawa (JP); Kenji Shimamura, Saitama (JP); Ryo Harigae, Tokyo (JP); Toshiaki Yamaguchi, Tokyo (JP); Kouhei Tokuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 17/186,228

(22) Filed: Feb. 26, 2021

(65) Prior Publication Data

US 2021/0276348 A1  Sep. 9, 2021

(30) Foreign Application Priority Data

Mar. 5, 2020  (JP) .............................. JP2020-03 8122

(51) Int. Cl.
| | |
|---|---|
| *B41J 29/38* | (2006.01) |
| *B41J 13/00* | (2006.01) |
| *G06K 15/02* | (2006.01) |
| *G06K 15/16* | (2006.01) |

(52) U.S. Cl.
CPC .......... *B41J 13/0009* (2013.01); *G06K 15/16* (2013.01); *G06K 15/1807* (2013.01)

(58) Field of Classification Search
CPC .. B41J 13/0009; G06K 15/16; G06K 15/1807
See application file for complete search history.

(56) References Cited

U.S. PATENT DOCUMENTS

| | | | | |
|---|---|---|---|---|
| 2009/0324314 | A1* | 12/2009 | Tanabe | B41J 15/046 400/208.1 |
| 2017/0043596 | A1* | 2/2017 | Motoyama | B26D 3/14 |
| 2018/0257408 | A1* | 9/2018 | Eiyama | B41J 11/0095 |

FOREIGN PATENT DOCUMENTS

JP  2013-176997 A  9/2013

\* cited by examiner

*Primary Examiner* — Moustapha Diaby
(74) *Attorney, Agent, or Firm* — Venable LLP

(57) ABSTRACT

A printing apparatus includes a conveyance unit including a pair of rotation members that nip a roll sheet, and configured to convey the sheet by rotation of the pair of rotation members, a printing unit, and a control unit configured to, upon executing a new print job, cause the conveyance unit to perform a preparatory operation in which the sheet is conveyed in a forward direction and then conveyed in a reverse direction and stopped. If a predetermined condition is met after completion of a previous print job, the control unit causes the conveyance unit to perform the preparatory operation, and if the predetermined condition is not met after completion of a previous print job, the control unit does not cause the conveyance unit to perform the preparatory operation.

16 Claims, 10 Drawing Sheets

PRINTING APPARATUS, CONTROL METHOD, AND NON-TRANSITORY COMPUTER-READABLE STORAGE MEDIUM

BACKGROUND OF THE INVENTION

Field of the Invention

The present invention relates to a printing apparatus.

Description of the Related Art

There has been known a printing apparatus that pulls out a sheet from a roll sheet and performs printing thereon. If a user touches the roll sheet during a printing operation, this may affect the sheet conveyance accuracy. To prevent this, a printing apparatus provided with a cover that covers a roll sheet has been proposed (for example, Japanese Patent Laid-Open No. 2013-176997).

In a conveyance mechanism that conveys a sheet, backlash exists. Since the maximum amount of the backlash is known by design or an experiment, it is normally possible to perform control considering the backlash, and the sheet conveyance accuracy is not affected. However, for example, if a user touches the roll sheet during standby before starting a print job, the backlash that does not reach the maximum amount can be generated. If the print job is executed in this state, the sheet conveyance accuracy may be affected.

SUMMARY OF THE INVENTION

The present invention provides a technique that can improve the sheet conveyance accuracy without largely decreasing the printing efficiency.

According to an aspect of the present invention, there is provided a printing apparatus comprising: a supporting unit configured to rotatably support a roll sheet which is a sheet wound into a roll form; a conveyance unit including a pair of rotation members that nip the sheet pulled out from the roll sheet, and configured to convey the sheet by rotation of the pair of rotation members; a printing unit configured to perform printing on the sheet conveyed by the conveyance unit; and a control unit configured to, upon executing a new print job, cause the conveyance unit to perform a preparatory operation in which the sheet is conveyed in a forward direction and then conveyed in a reverse direction and stopped, wherein if a predetermined condition is met after completion of a previous print job, the control unit causes the conveyance unit to perform the preparatory operation, and if the predetermined condition is not met after completion of a previous print job, the control unit does not cause the conveyance unit to perform the preparatory operation.

Further features of the present invention will become apparent from the following description of exemplary embodiments (with reference to the attached drawings).

DESCRIPTION OF THE EMBODIMENTS

Figure 1:
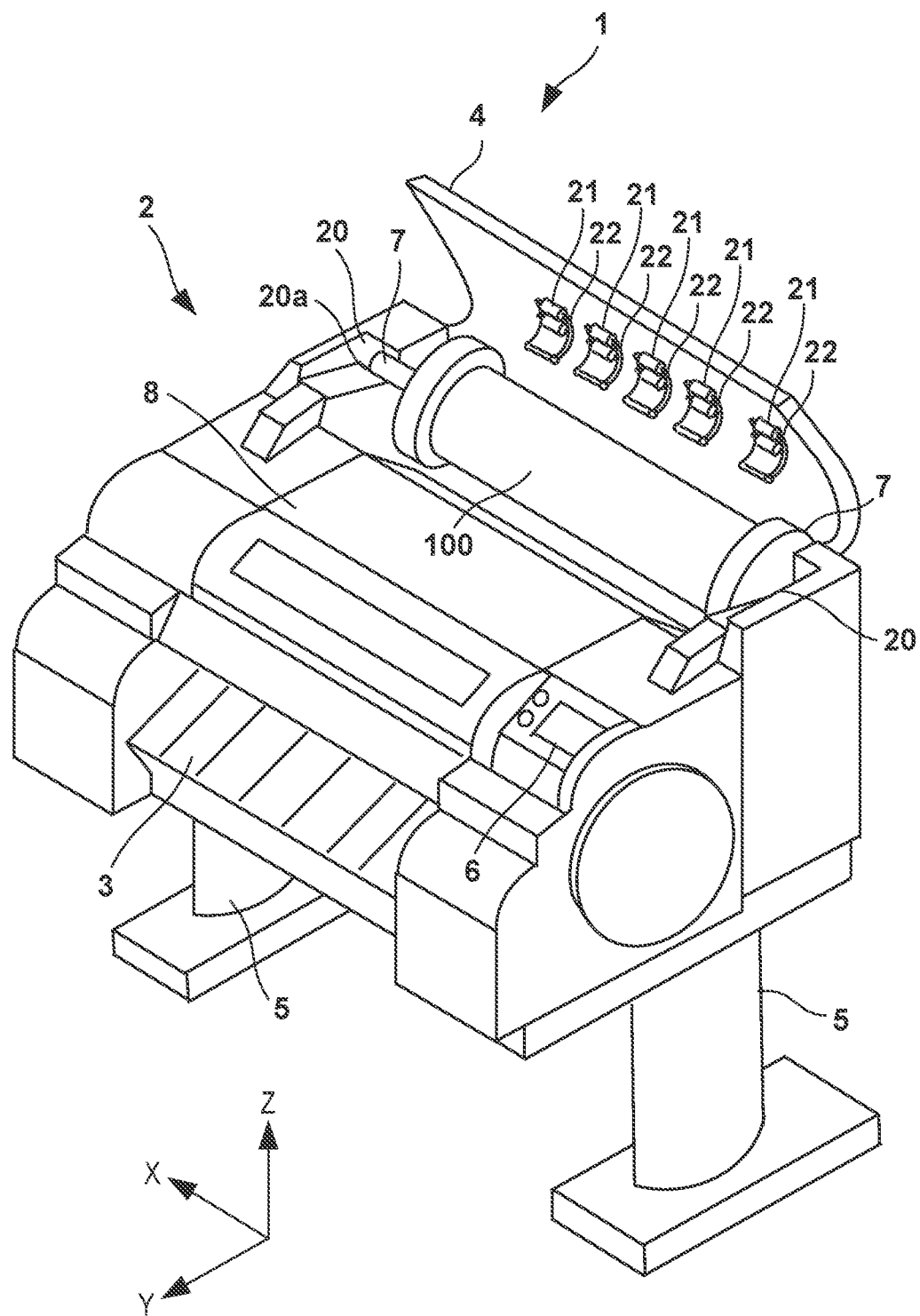
FIG. 1 is an external view of a printing apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<Outline of Printing Apparatus>

Figure 2:
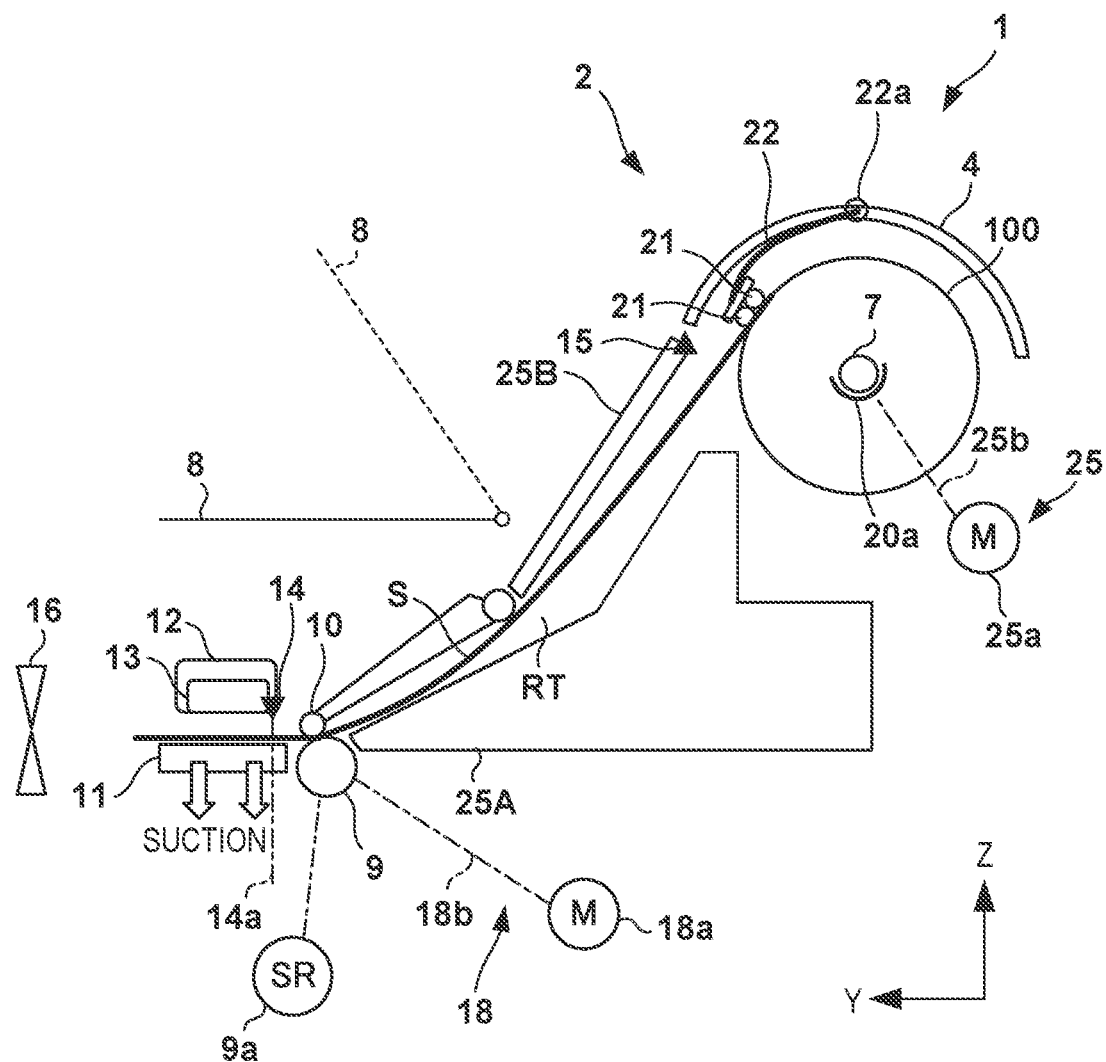
FIG. 2 is a schematic view showing the internal arrangement of the printing apparatus shown in FIG. 1.

FIG. 1 is an external view of a printing apparatus 1 in this embodiment. FIG. 2 is a schematic view showing the internal arrangement of the printing apparatus 1. In the drawings, X indicates the widthwise direction (left-and-right direction) of the printing apparatus 1, Y indicates the depth direction (front-and-rear direction) of the printing apparatus 1, and Z indicates the vertical direction. In this embodiment, a case will be described in which the present invention is applied to a serial inkjet printing apparatus that performs printing by scanning a carriage mounted with a printhead. However, the present invention is also applicable to a printing apparatus of another form.

Note that "printing" includes not only forming significant information such as characters and graphics but also forming images, figures, patterns, and the like on print media in a broad sense, or processing print media, regardless of whether the information formed is significant or insignificant or whether the information formed is visualized so that a human can visually perceive it. In addition, although in this embodiment, sheet-like paper is assumed as a "print medium" serving as a print target, sheet-like cloth, plastic film, and the like may be used as print media.

The printing apparatus 1 is supported by a pair of leg portions 5. A feeding device 2 is provided on the far side (rear side) of the printing apparatus 1, and a paper discharge tray 3 is provided on the near side (front side). An operation panel 6, which is used by the user to input various settings and commands and check information, is provided on the upper surface of the printing apparatus 1.

The printing apparatus 1 is an apparatus that can pull out a sheet S from a roll sheet 100 and print an image thereon. The sheet S is one continuous sheet, and the roll sheet 100 is obtained by winding the sheet S into a roll form around a cylindrical core. The roll sheet 100 particularly indicates a roll portion of the sheet S.

The feeding device 2 includes a roll supporting unit 20 that rotatably supports the roll sheet 100. Holders 7, which define the rotational center axis (X-direction axis) of the roll sheet 100, are detachably attached to both end portions of the roll sheet 100. By setting, in holding portions 20a, the roll sheet 100 with the holders 7 attached thereto, the user can use the roll sheet 100 for printing. The roll supporting unit 20 includes the left and right holding portions 20a each of which rotatably supports the spool shaft of the holder 7. Each holding portion 20a is a valley-shaped groove, and rotatably supports the shaft portion of the holder 7 in its bottom portion.

The feeding device 2 includes a cover 4 that covers the roll sheet 100 supported by the roll supporting unit 20. The cover 4 is a member having an arc-shaped cross section, and provided so as to be openable/closable between a cover position (for example, the position shown in FIG. 2) where it covers the roll sheet 100 and a retreat position (for example, the position shown in FIG. 1) where it exposes the roll sheet 100 to the outside. The cover 4 can protect the roll sheet 100 from adhesion of dust, and prevent the user from touching the roll sheet 100 during printing and disturbing the printed image.

On the inner surface of the cover 4, each roller 21 is rotatably supported via an arm member 22. The roller 21 is provided such that it can abut against the outer peripheral surface of the roll sheet 100. In this embodiment, two rollers 21 and the arm member 22 form a set, and a plurality of the sets are arranged in the X direction so as to be spaced apart from each other. The arm member 22 is supported by the cover 4 so as to be pivotable around the X-direction axis, and an elastic member 22a such as a torsion coil spring is provided in the root portion of the arm member 22. The elastic member 22a biases the arm member 22 in a direction in which the roller 21 is pressed against the outer peripheral surface of the roll sheet 100. Since the roller 21 is pressed against the outer peripheral surface of the roll sheet regardless of the winding diameter of the roll sheet 100, it is possible to stably feed the sheet S.

The feeding device 2 includes a feeding driving unit 25 that rotates the roll sheet 100 supported by the roll supporting unit 20 to feed it into a conveyance path RT. The driving unit 25 includes a feeding motor 25a as a driving source, and a transmission mechanism 25b such as a gear mechanism that transmits the driving force of the feeding motor 25a to the spool gear of the holder 7. By rotating the feeding motor 25a, the sheet S of the roll sheet 100 can be fed into the conveyance path RT.

The conveyance path RT is formed as a space between an upper guide member 25B and a lower guide member 25A. A nip portion between a conveying roller 9 and a pinch roller 10 is located in the downstream end of the conveyance path RT. The conveying roller 9 and the pinch roller 10 are a pair of rotation members, each of which is provided so as to be rotatable around the X-direction axis. The pinch roller 10 is pressed against the conveying roller 9 and rotates following the rotation of the conveying roller 9. The conveying roller 9 and the pinch roller 10 are located on the upstream side of the printing position of a printhead 13 in the conveyance direction (Y direction). In the following description, the upstream side and the downstream side are based on the conveyance direction of the sheet S.

The printing apparatus 1 includes a driving unit 18 that rotates the conveying roller 9. The driving unit 18 includes a conveyance motor 18a as a driving source, and a transmission mechanism 18b such as a gear mechanism or a belt transmission mechanism that transmits the driving force of the conveyance motor 18a to the conveying roller 9. By driving the conveyance motor 18a, when performing printing, the sheet S is nipped between the conveying roller 9 and the pinch roller 10 and, by rotation of these rollers, conveyed onto a platen 11 arranged so as to face the printhead 13.

The rotation amount of the conveying roller 9 is detected by a sensor 9a. Based on the detection result of the sensor 9a, the conveyance amount of the sheet S can be specified, and the conveyed position of the sheet S can be specified. The sensor 9a is, for example, a rotary encoder.

The platen 11 supports the sheet S from below, and guarantees a gap between the printhead 13 and the sheet S. A plurality of intake holes are formed in the platen 11, and the plurality of intake holes are connected to a suction fan (not shown) (a suction fan 17 shown in FIG. 3) via a duct. By driving the suction fan 17, a suction negative pressure is generated in the intake holes of the platen 11, and this enables the sheet S to be chucked and held on the platen 11.

The printhead 13 is mounted on a carriage 12. The carriage 12 is supported such that it can be reciprocated in the X direction (main scanning direction). The carriage 12 is reciprocated in the X direction by a driving mechanism which uses a carriage motor 12a (FIG. 3) as a driving source.

The printhead 13 is provided with discharge ports (nozzles) that discharge ink. The ink is supplied to the printhead 13 from an ink reservoir (not shown). While the carriage 12 is moved, the ink is discharged from the printhead 13 onto the sheet S. With a discharge operation of the printhead 13 and a movement of the carriage 12, an image for one line can be printed. By alternately repeating such image printing and intermittent conveyance of the sheet S by the conveying roller 9 in the Y direction (subscanning direction), an image for one page can be printed. A cutter 16 is arranged on the downstream side of the printhead 13 and the platen 11 in the conveyance direction of the sheet S. The cutter 16 cuts the printed sheet S in the X direction. Thus, a cut sheet with an image printed thereon can be obtained from the roll sheet 100.

The printing apparatus 1 includes an openable/closable top cover 8. The dashed line in FIG. 2 indicates the top cover 8 in an open state. When the top cover 8 is open, a part of the sheet S and the mechanisms around the carriage 12 or the cutter 16 are exposed to the outside, and maintenance thereof can be performed.

The printing apparatus 1 includes a leading end detection sensor 14 that detects the leading end of the sheet S. The leading end detection sensor 14 is mounted on the carriage 12 in this embodiment, but the arrangement portion of the leading end detection sensor 14 is not limited to this, and the leading end detection sensor 14 may be fixed to and arranged in the upstream-side end portion of the platen 11 or the like.

The leading end detection sensor 14 is a sensor whose output changes before and after the leading end of the sheet S passes a detection position 14a. For example, an optical sensor, a reflection PI sensor, a flag-type PI sensor, or the like can be used as the leading end detection sensor 14. The optical sensor includes, for example, a light emitting element and a light receiving element. The light emitting element emits light onto the sheet S, and the light receiving element receives the reflected light. The detection position 14a is set on the downstream side of the nip portion between the conveying roller 9 and the pinch roller 10 and adjacent to the nip portion.

The printing apparatus 1 includes an opening/closing detection sensor 15 that detects opening/closing of the cover 4. In this embodiment, the opening/closing detection sensor 15 is provided on the side of the apparatus main body, but it may be provided on the side of the cover 4. The opening/closing detection sensor 15 is, for example, a mechanical sensor such as a push-button switch which is pressed when the cover 4 is in a closed state, or an optical sensor that detects contact and separation of the cover 4.

<Control Device>

Figure 3:
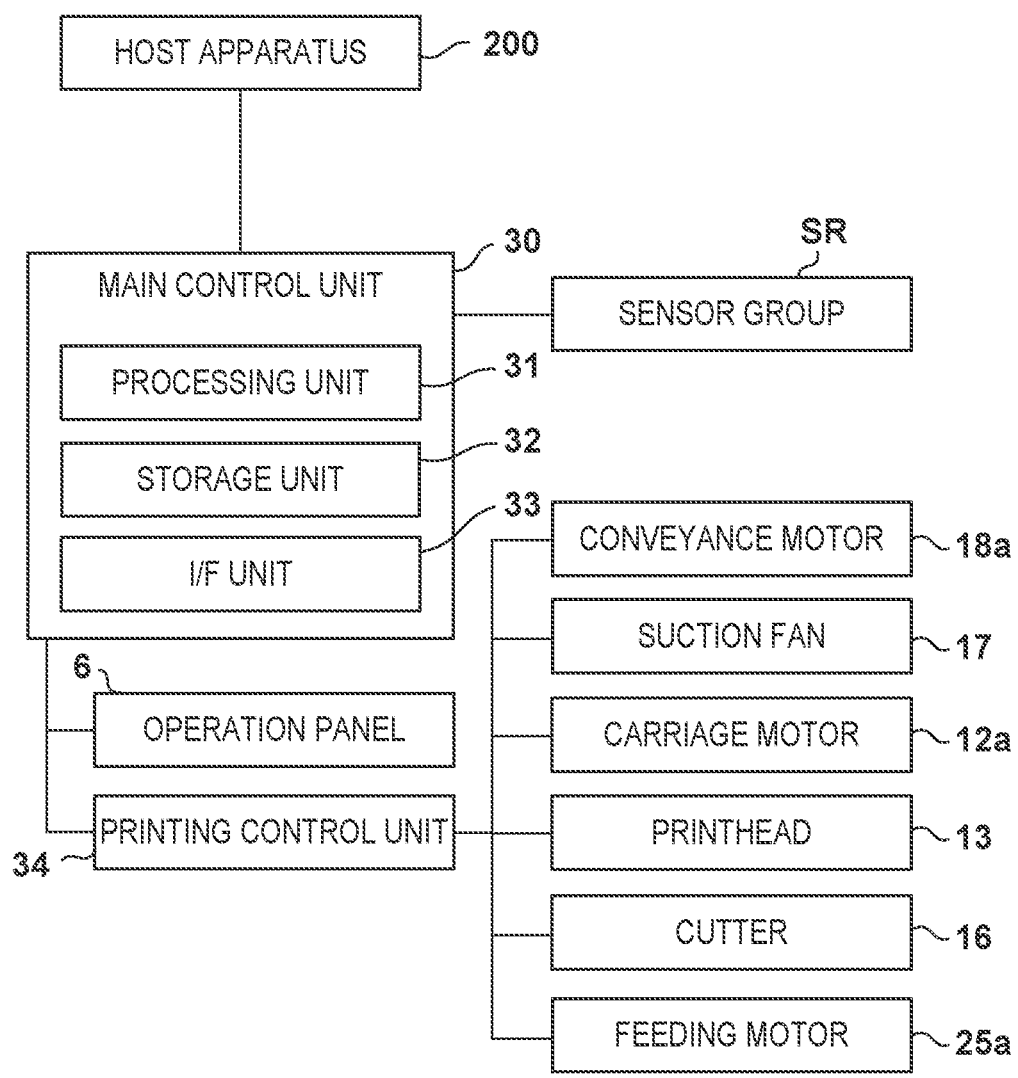
FIG. 3 is a block diagram of a control device of the printing apparatus shown in FIG. 1.

With reference to FIG. 3, a control device of the printing apparatus 1 will be described. The control device includes a main control unit 30 and a printing control unit 34. The main control unit 30 receives a print job including image data and a print instruction thereof from a host apparatus 200, and performs a printing operation. The main control unit 30 includes a processing unit 31, a storage unit 32, and an interface unit (I/F unit) 33, and controls the entire printing apparatus 1. The processing unit 31 is a processor represented by a CPU, and executes programs stored in the storage unit 32. The storage unit 32 is a storage device such as a RAM or a ROM, and stores programs and data. By following instructions of the main control unit 30 based on detection results of a sensor group SR, the printing control unit 34 controls the conveyance motor 18a, the suction fan 17, the carriage motor 12a, the printhead 13, the cutter 16, the feeding motor 25a, and the like. The sensor group SR includes the sensor 9a, the leading end detection sensor 14, the opening/closing detection sensor 15, and the like.

<Backlash>

Figure 4A:
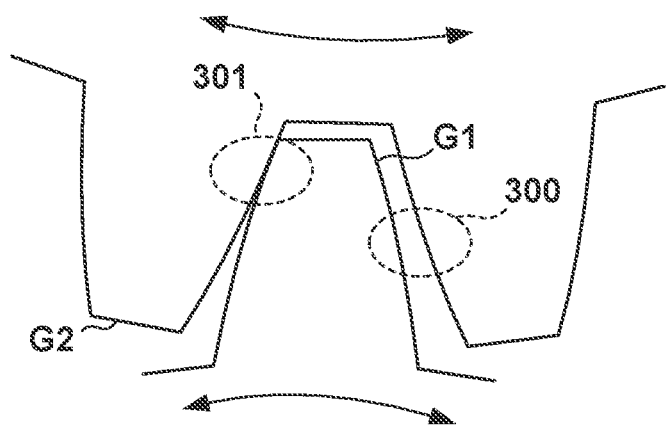
FIGS. 4A and 4B are views for explaining backlash.
Figure 4B:
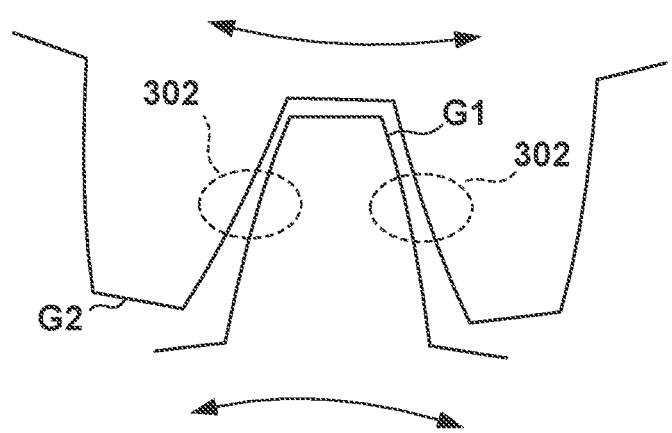

Backlash exists in the transmission mechanism 18b. FIGS. 4A and 4B are views showing an example of the backlash. In the example shown in FIGS. 4A and 4B, the transmission mechanism 18b includes a gear G1 and a gear G2, and the backlash between the teeth that mesh with each other is illustrated. The driving force is not transmitted between the teeth until the gear is rotated by an amount corresponding to the backlash. Therefore, the backlash can influence the conveyance accuracy of the sheet S in the conveyance mechanism.

FIG. 4A shows a state in which one side surface of a tooth of the gear G1 abuts against the gear G2 (a portion 301), and backlash 300 is generated between the other side surface and a teeth of the gear G2. The backlash 300 is backlash of a maximum amount in this gear mechanism, and this is known by design or an experiment. Therefore, even in a case in which the gear G1 is rotated in a direction to decrease the backlash from this state to transmit the driving force to the gear G2, the influence of the backlash on the conveyance accuracy can be corrected.

FIG. 4B shows a state in which backlash 302 is generated between the one side surface of the tooth of the gear G1 and between the other side surface and the gear G2. The amount of the backlash 302 is a variable amount and difficult to be specified. If the gear G1 is rotated from this state to transmit the driving force to the gear G2, the conveyance accuracy may be affected.

In this embodiment, when the backlash 302 as shown in FIG. 4B is likely to be generated, by performing a preparatory operation to be described later, conveyance of the sheet S is controlled such that the known backlash 300 is generated as shown in FIG. 4A. Note that the case in which the transmission mechanism 18b includes a gear mechanism has been described in FIGS. 4A and 4B, but the present invention is also applicable to a case in which a transmission mechanism including teeth that mesh with each other, such as a belt transmission mechanism using a toothed belt, is employed as the transmission mechanism 18b.

<Control Example>

Figure 5:
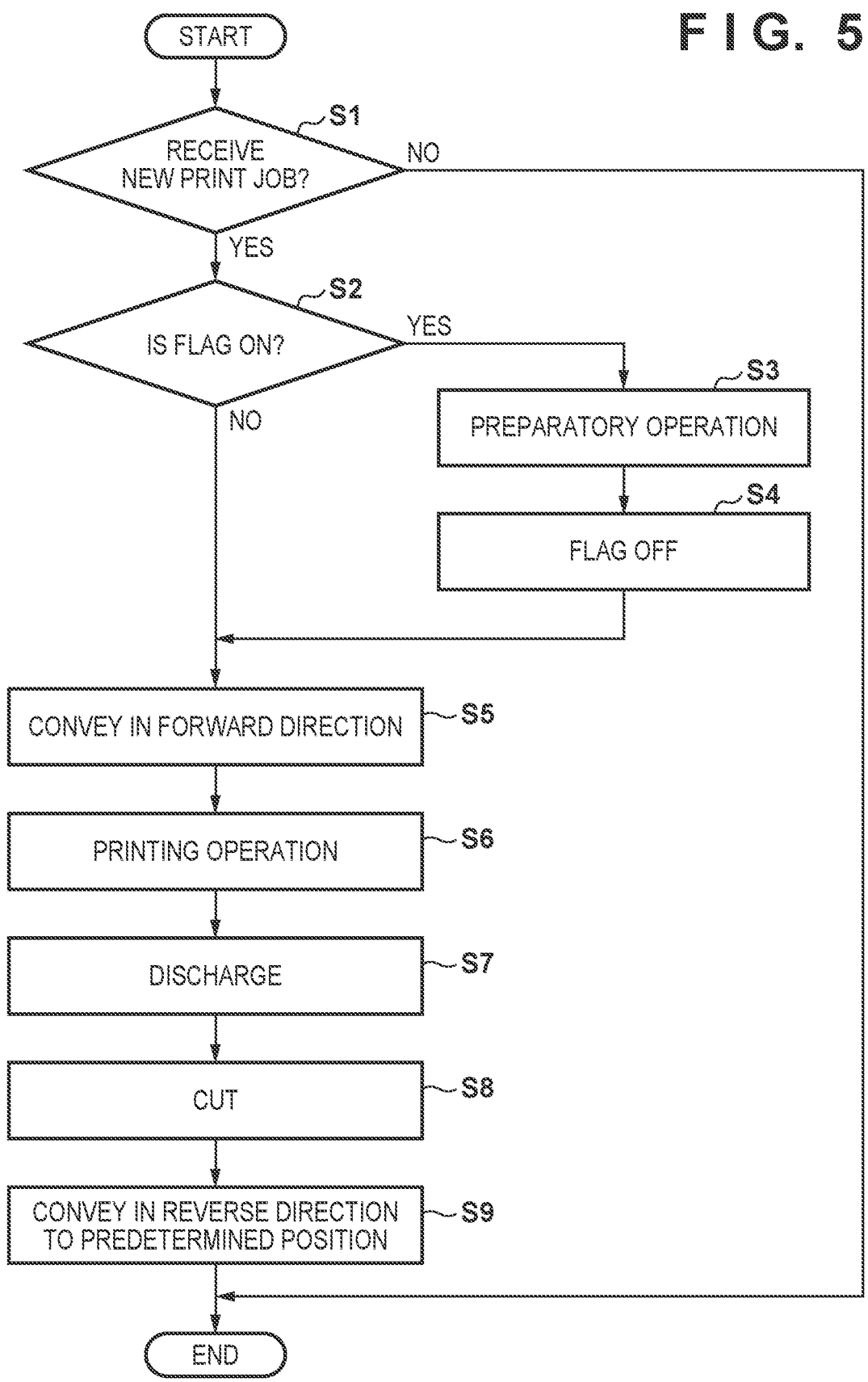
FIG. 5 is a flowchart illustrating an example of control processing of the printing apparatus shown in FIG. 1.

A control example of the printing apparatus 1 by the main control unit 30 will be described. FIG. 5 is a flowchart illustrating the control example by the main control unit 30.

After being powered on and performing initial processing, the main control unit 30 repeatedly performs the processing illustrated in FIG. 5.

In step S1, it is determined whether a new print job is received from the host apparatus 200. If a new print job is received, it is determined in step S2 whether a flag indicating whether to perform a preparatory operation is ON. If the flag is ON, the process advances to step S3, and if the flag is OFF, the process advances to step S5. The preparatory operation to be described later is performed in step S3, and the flag is set OFF in step S4.

In processing from step S5, the new print job is executed. In step S5, the driving unit 18 and the feeding driving unit 25 are driven to rotate the conveying roller 9 and the roll sheet 100, thereby conveying the sheet S to a printing start position. Conveyance in a forward direction means that the sheet S is conveyed to the downstream side, and conveyance in a reverse direction means that the sheet S is conveyed (returned) to the upstream side.

A printing operation is performed in step S6. Here, by alternately repeating printing of an image for one line by the ink discharge operation of the printhead 13 and the moving operation of the carriage 12, and intermittent conveyance of the sheet S by rotation of the conveying roller 9, an image is printed on the sheet S. In step S7, a discharge operation is performed. Here, the driving unit 18 and the feeding driving unit 25 are driven to rotate the conveying roller 9 and the roll sheet 100, thereby conveying the sheet S in the forward direction to a cutting position. In step S8, the sheet S is cut by the cutter 16.

In step S9, the sheet S is conveyed in the reverse direction to a predetermined position, and a standby state to wait for a next print job is set. FIGS. 8A to 8D schematically show the operation of the printing apparatus 1 in the processing in steps S8 and S9.

Figure 8A:
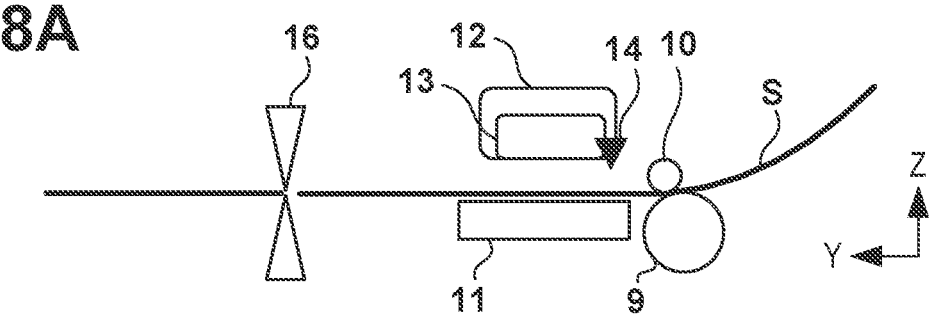
FIGS. 8A to 8D are views for explaining the operation of the printing apparatus shown in FIG. 1.
Figure 8B:
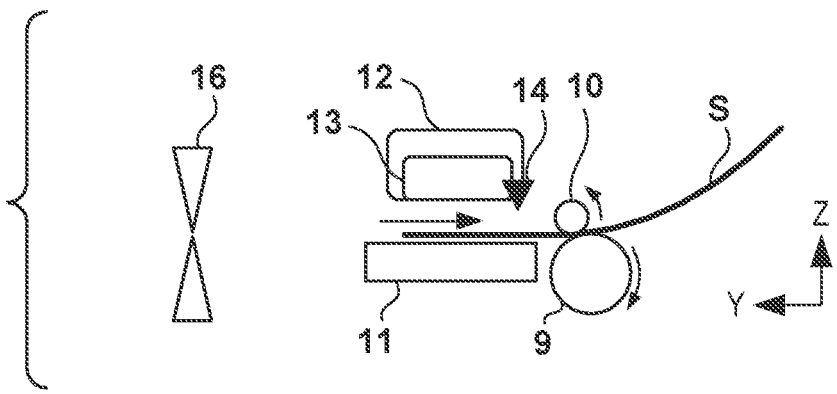
Figure 8C:
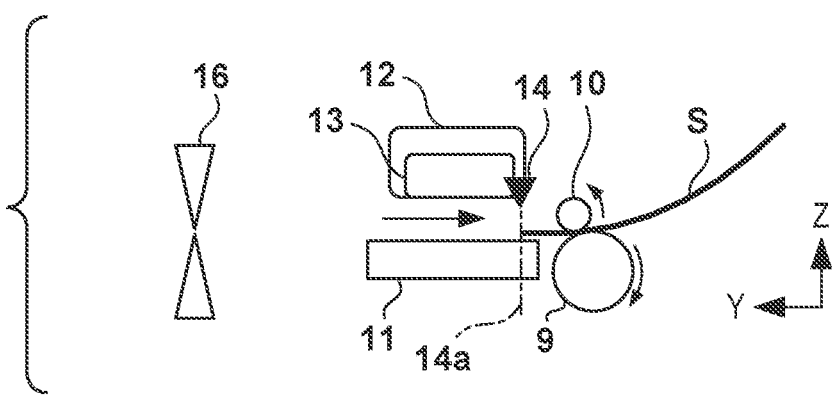
Figure 8D:
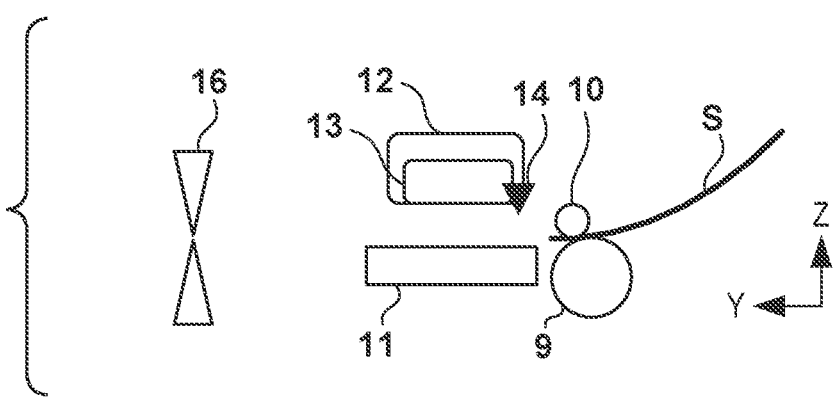

FIG. 8A shows a state in which the sheet S is cut by the cutter 16. Thereafter, the conveying roller 9 is reversely rotated to convey the sheet S in the reverse direction as shown in FIG. 8B. At this time, the roll sheet 100 may be also reversely rotated to adjust the tension of the sheet S. FIG. 8C shows a state in which the leading end detection sensor 14 detects that the leading end of the sheet S has passed the detection position 14a. From this state, the sheet S is conveyed in the reverse direction by a predetermined amount, and the conveyance of the sheet S is stopped. Every time a new print job is received, the sheet S is located at a standby position where the leading end is at a certain position (in this embodiment, a position where the leading end is slightly on the downstream side of the nip portion between the conveying roller 9 and the pinch roller 10).

When the sheet S is located at the standby position, the state of the backlash in the transmission mechanism 18b is normally the state in which the known backlash is generated as shown in FIG. 4A. However, if a situation to rotate the conveying roller 9 occurs, such as a case in which the user touches the roll sheet 100, the backlash difficult to be specified may be generated as shown in FIG. 4B. In such a case, by performing the preparatory operation in step S3 of FIG. 5, the state of the backlash in the transmission mechanism 18b is set to the known state as shown in FIG. 4A.

Figure 6:
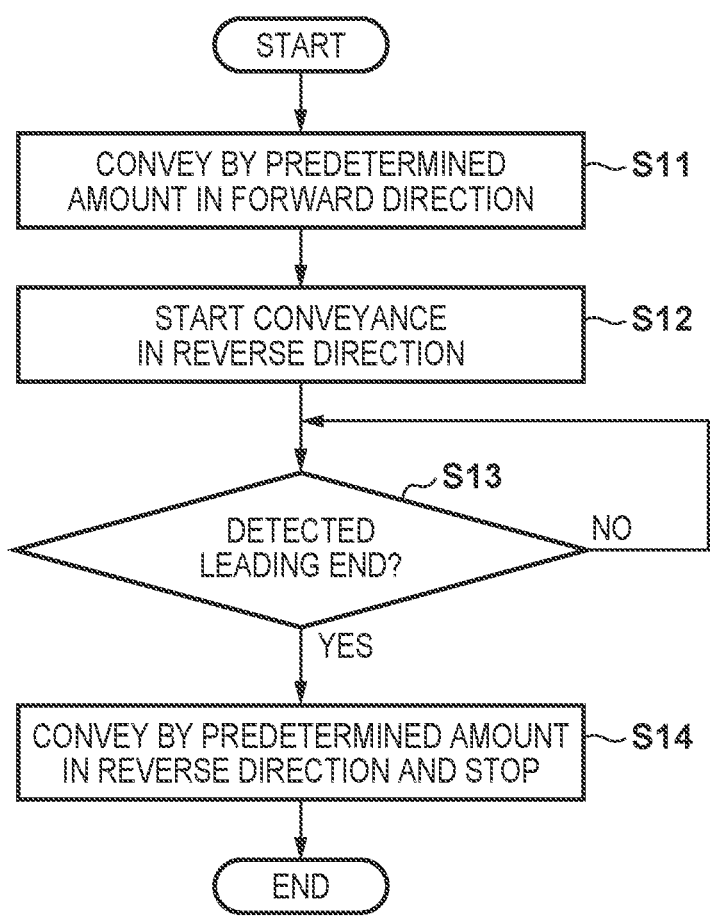
FIG. 6 is a flowchart illustrating an example of control processing of the printing apparatus shown in FIG. 1.
Figure 9A:
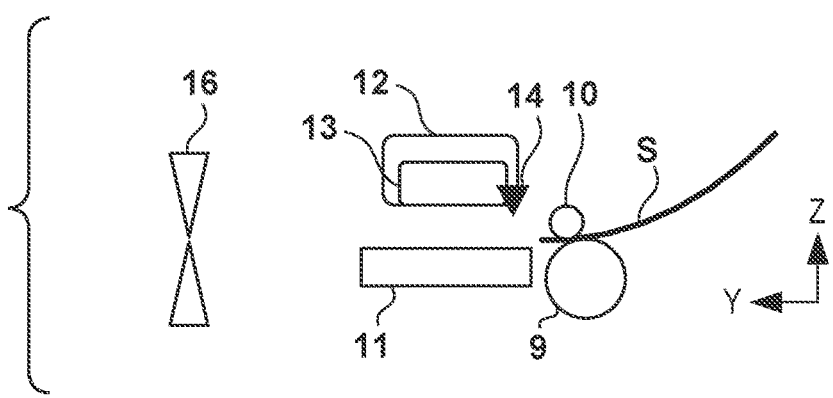
FIGS. 9A to 9D are views for explaining the operation of the printing apparatus shown in FIG. 1.
Figure 9B:
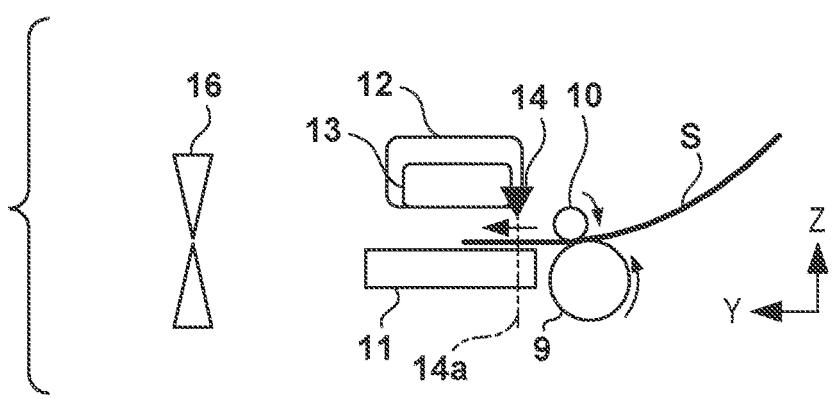

FIG. 6 is a flowchart illustrating processing of the preparatory operation in step S3, and FIGS. 9A to 9D schematically show the preparatory operation. FIG. 9A shows a state in which the sheet S is located at the standby position. From this state, the conveying roller 9 is rotated in the forward direction in step S11 of FIG. 6. With this processing, as shown in FIG. 9B, the sheet S is conveyed in the forward direction by a predetermined amount. The conveyance amount of the sheet S is only required to be a conveyance amount which makes the leading end of the sheet S pass the detection position 14a of the sensor 14. At this time, the roll sheet 100 may be also rotated in the forward direction to adjust the tension of the sheet S.

Figure 9C:
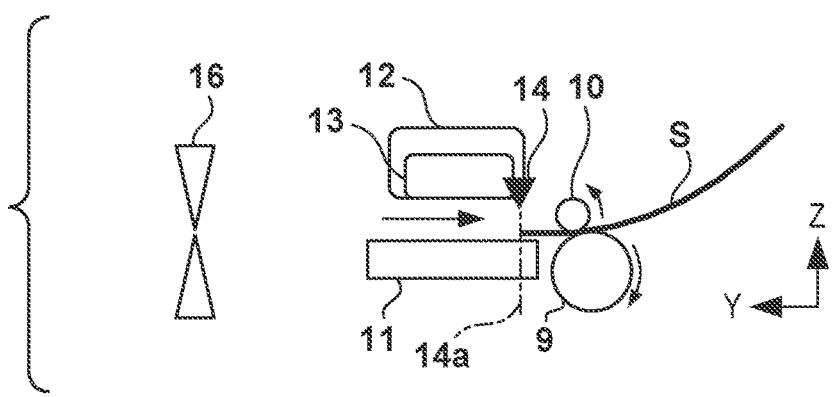
Figure 9D:
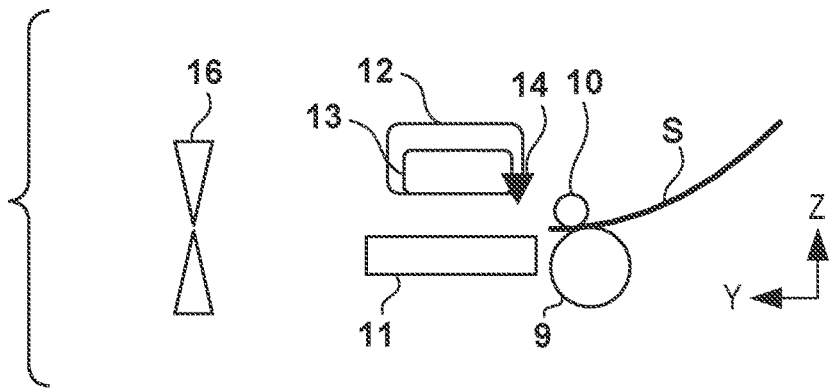

In step S12 of FIG. 6, the conveying roller 9 is reversely rotated to convey the sheet S in the reverse direction. In step S13, it is determined whether the leading end detection sensor 14 detects that the leading end of the sheet S has passed the detection position 14a. FIG. 9C shows a state in which the leading end is detected. If the leading end is detected, the process advances to step S14; otherwise, the determination processing in step S13 is repeated. In step S14, the sheet S is conveyed in the reverse direction by a predetermined amount, and the conveyance of the sheet S is stopped. The conveyance amount of the sheet S here is equal to the conveyance amount in step S9 of FIG. 5. With this processing, the sheet S is located at the standby position. In addition, the state of the backlash in the transmission mechanism 18b becomes the state in which the known backlash is generated as shown in FIG. 4A. As has been described above, if the backlash difficult to be specified may be generated, by performing the preparatory operation, it is possible to correct the transmission mechanism 18b to the state in which the known backlash is generated. Therefore, it is possible to manage the backlash.

Next, flag ON control will be described. The preparatory operation may be performed every time a new print job is executed, but in that case, the frequency of the preparatory operation unnecessarily increases. That is, it is useless to perform the preparatory operation in the state in which the known backlash is generated, and the printing efficiency is decreased by the time for the preparatory operation. Therefore, in this embodiment, if a predetermined condition is met, the flag is set ON and the preparatory operation is performed, and if the predetermined condition is not met, the preparatory operation is omitted. This can improve the sheet conveyance accuracy by managing the backlash of the conveyance mechanism without largely decreasing the printing efficiently.

Figure 7:
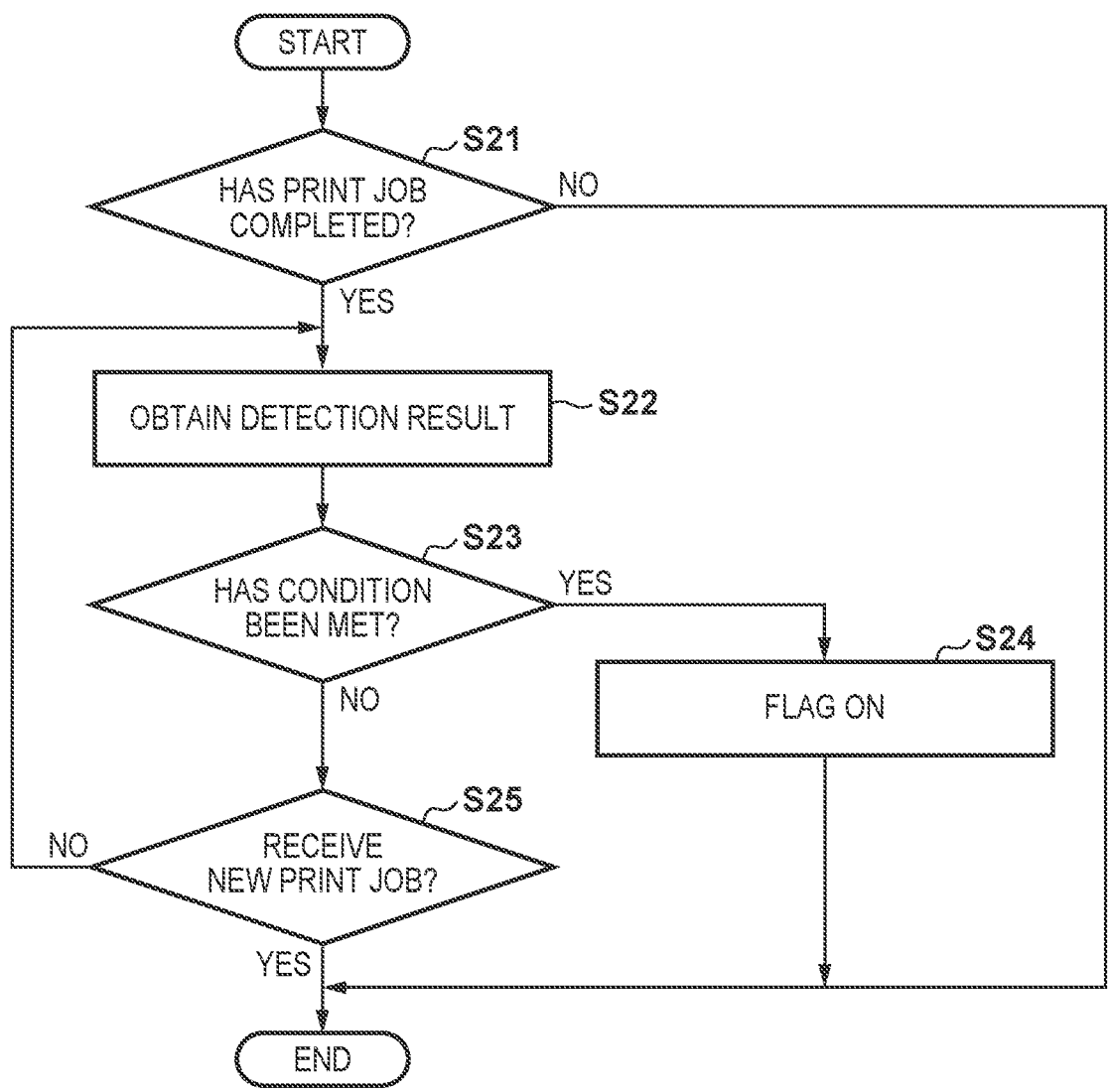
FIG. 7 is a flowchart illustrating an example of control processing of the printing apparatus shown in FIG. 1.

FIG. 7 is a flowchart illustrating a processing example concerning the flag ON control. In this embodiment, the printing apparatus 1 is monitored after completion of a previous print job until a new print job is received, and it is determined whether a situation in which the conveying roller 9 may be rotated occurs.

In step S21, it is determined whether the current print job is completed. If the current print job is completed, the process advances to step S22, and monitoring of the printing apparatus 1 is started. Note that in this embodiment, the print job is determined to be completed when the sheet S is conveyed to the standby position by the processing in step S9 of FIG. 5.

In step S22, the detection result of the opening/closing detection sensor 15 is obtained. Based on the detection result of the opening/closing detection sensor 15 obtained in step S22, it is determined in step S23 whether the condition to set the flag ON is met. More specifically, it is determined whether the cover 4 is open. If the cover 4 is open, the user may touch the roll sheet 100 and the roll sheet 100 may be rotated. In this case, the conveying roller 9 nipping the sheet S may be rotated, and backlash difficult to be specified can be generated. Therefore, if the cover 4 is open, it is determined that the condition is met, and the process advances to step S24 to set the flag ON. Thus, the preparatory operation is performed when a new print job is executed.

If the cover 4 is not open, the process advances to step S25. In step S25, it is determined whether a new print job is received. If a new print job is received, monitoring is terminated; otherwise, the process returns to step S22 and monitoring is continued.

Second Embodiment

In the first embodiment, the preparatory operation is performed on condition that the cover 4 is open. However, the condition to perform the preparatory operation is not limited to this. The preparatory operation may be performed if an opening operation, by the user, of an opening and closing unit other that the cover 4 included in the printing apparatus 1 is detected. For example, this is a case in which an opening operation of an opening and closing unit, such as the top cover 8, whose opening operation exposes at least a part of the region from the roll sheet 100 to the conveying roller 9 and the pinch roller 10 in the interior of the printing apparatus 1 is detected.

Figure 10A:
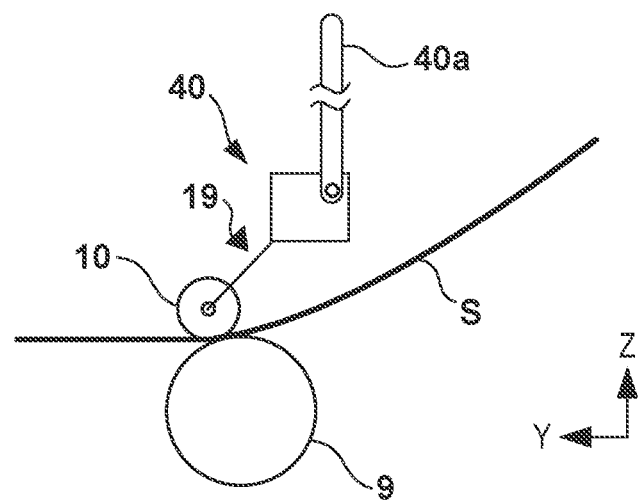
FIGS. 10A and 10B are explanatory views of a contact/separation mechanism between a conveying roller and a pinch roller.
Figure 10B:
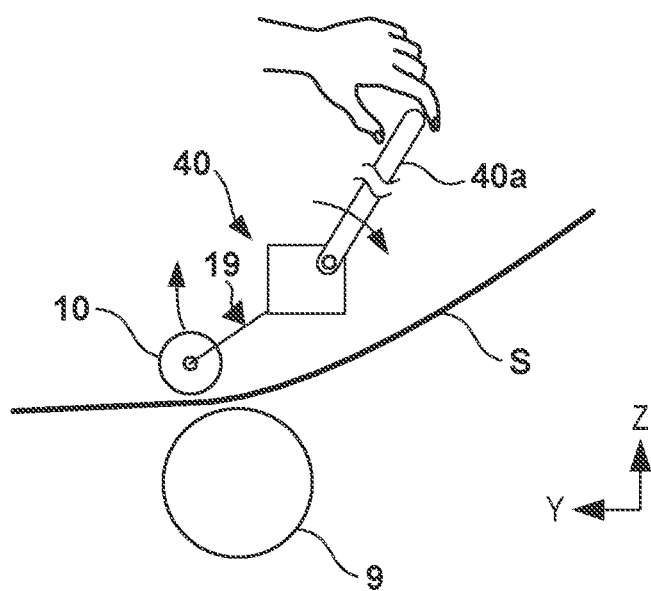

Further, the preparatory operation may be performed on condition that a predetermined operation of a unit other than the opening and closing unit is performed. For example, in an arrangement in which an operating unit that can release press-contact between the conveying roller 9 and the pinch roller 10 is provided, the preparatory operation may be performed if a release operation is performed. FIGS. 10A and 10B show an example of this arrangement.

In FIG. 10A, a contact/separation mechanism 40 is a mechanism that separates a pinch roller 10 from a conveying roller 9 when a lever-shaped operating unit 40a is operated. FIG. 10A shows a state in which the conveying roller 9 and the pinch roller 10 are in press-contact with each other. If a user performs a release operation on the operating unit 40a as shown in FIG. 10B, the contact/separation mechanism 40 displaces the pinch roller 10 to separate it from the conveying roller 9.

The contact/separation state between the conveying roller 9 and the pinch roller 10 is detected by a contact/separation detection sensor 19. The contact/separation detection sensor 19 is, for example, an optical sensor or a mechanical sensor that detects movement of a link which is included in the contact/separation mechanism 40 and displaced synchronously with displacement of the pinch roller 10.

If the conveying roller 9 and the pinch roller 10 are separated from each other and the press-contact therebetween is released, the conveying roller 9 may rotate slightly and the backlash state of the transmission mechanism 18b may change. Therefore, after completion of a previous print job, if the contact/separation detection sensor 19 detects that the conveying roller 9 and the pinch roller 10 are separated from each other, the flag is set ON and the preparatory operation is performed.

The condition to set the flag ON is not limited to one condition, and there may be a plurality of conditions. For example, the flag may be set ON in both of a case in which an opening operation of the opening and closing unit is performed and a case in which it is detected that the conveying roller 9 and the pinch roller 10 are separated from each other.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-038122, filed Mar. 5, 2020, which is hereby incorporated by reference herein in its entirety.

What is claimed is:

1. A printing apparatus comprising:
a supporting unit configured to rotatably support a roll sheet which is a sheet wound into a roll form;
a conveyance unit including a pair of rotation members that nip the sheet pulled out from the roll sheet, and configured to convey the sheet by rotation of the pair of rotation members;
a printing unit configured to perform printing on the sheet conveyed by the conveyance unit; and
a control unit configured to, upon executing a new print job, cause the conveyance unit to perform a preparatory operation in which the sheet is conveyed in a forward direction and then conveyed in a reverse direction and stopped,
wherein if a predetermined condition is met after completion of a previous print job, the control unit causes the conveyance unit to perform the preparatory operation, and
if the predetermined condition is not met after completion of a previous print job, the control unit does not cause the conveyance unit to perform the preparatory operation.

2. The apparatus according to claim 1, wherein the predetermined condition is that an opening operation of an opening and closing unit included in the printing apparatus is detected.

3. The apparatus according to claim 2, wherein by the opening operation of the opening and closing unit, at least a part of a region from the roll sheet to the pair of rotation members is exposed.

4. The apparatus according to claim 1, further comprising:
a cover configured to cover the roll sheet supported by the supporting unit; and
an opening/closing detection unit configured to detect opening/closing of the cover,
wherein the predetermined condition includes at least that after completion of a previous printing job, the opening/closing detection unit detects that the cover is open.

5. The apparatus according to claim 1, further comprising:
an operating unit configured to separate the pair of rotation members from each other; and
a contact/separation detection unit configured to detect a contact/separation state of the pair of rotation members,
wherein the predetermined condition includes at least that after completion of a previous print job, the contact/separation detection unit detects that the pair of rotation members are separated from each other.

6. The apparatus according to claim 1, wherein
the conveyance unit comprises a driving unit configured to rotate one of the pair of rotation members,
the driving unit includes a motor and a transmission mechanism configured to transmit an output of the motor to the one rotation member, and
the transmission mechanism is a mechanism including teeth that mesh with each other.

7. The apparatus according to claim 1, further comprising:
an end detection unit arranged on a downstream side of the pair of rotation members in a conveyance direction of the sheet, and configured to detect an end of the sheet,
wherein the preparatory operation is an operation in which the sheet is conveyed in the forward direction by a predetermined amount and then conveyed in the reverse direction and, if a leading end of the sheet is detected by the end detection unit, the sheet is conveyed in the reverse direction by a predetermined amount and stopped.

8. The apparatus according to claim 7, further comprising:
a cutter configured to cut the sheet having undergone printing,
wherein after the sheet is cut by the cutter, the control unit conveys the sheet in the reverse direction and, if the leading end of the sheet is detected by the end detection unit, conveys the sheet in the reverse direction by a predetermined amount and stops the conveyance.

9. A control method of a printing apparatus that includes:
a supporting unit configured to rotatably support a roll sheet which is a sheet wound into a roll form,
a conveyance unit including a pair of rotation members that nip the sheet pulled out from the roll sheet, and configured to convey the sheet by rotation of the pair of rotation members, and
a printing unit configured to perform printing on the sheet conveyed by the conveyance unit, the method comprising:
performing control to, upon executing a new print job, cause the conveyance unit to perform a preparatory operation in which the sheet is conveyed in a forward direction and then conveyed in a reverse direction and stopped,
wherein in the control,
if a predetermined condition is met after completion of a previous print job, the conveyance unit is caused to perform the preparatory operation, and
if the predetermined condition is not met after completion of a previous print job, the conveyance unit is not caused to perform the preparatory operation.

10. The method according to claim 9, wherein
the predetermined condition is that an opening operation of an opening and closing unit included in the printing apparatus is detected.

11. The method according to claim 10, wherein
by the opening operation of the opening and closing unit, at least a part of a region from the roll sheet to the pair of rotation members is exposed.

12. The method according to claim 9, further comprising:
detecting opening/closing of a cover configured to cover the roll sheet supported by the supporting unit,
wherein the predetermined condition includes at least that after completion of a previous printing job, it is detected that the cover is open.

13. A non-transitory computer-readable storage medium storing a program for causing a computer to execute a control method of a printing apparatus that includes:
   a supporting unit configured to rotatably support a roll sheet which is a sheet wound into a roll form,
   a conveyance unit including a pair of rotation members that nip the sheet pulled out from the roll sheet, and configured to convey the sheet by rotation of the pair of rotation members, and
   a printing unit configured to perform printing on the sheet conveyed by the conveyance unit, wherein
   the control method comprises:
      performing control to, upon executing a new print job, cause the conveyance unit to perform a preparatory operation in which the sheet is conveyed in a forward direction and then conveyed in a reverse direction and stopped, and
in the control,
if a predetermined condition is met after completion of a previous print job, the conveyance unit is caused to perform the preparatory operation, and
if the predetermined condition is not met after completion of a previous print job, the conveyance unit is not caused to perform the preparatory operation.

14. The medium according to claim 13, wherein
the predetermined condition is that an opening operation of an opening and closing unit included in the printing apparatus is detected.

15. The medium according to claim 14, wherein
by the opening operation of the opening and closing unit, at least a part of a region from the roll sheet to the pair of rotation members is exposed.

16. The medium according to claim 13, wherein
the control method comprises detecting opening/closing of a cover configured to cover the roll sheet supported by the supporting unit, and
the predetermined condition includes at least that after completion of a previous printing job, it is detected that the cover is open.

* * * * *